United States Patent [19]

Headington, Jr.

[11] 4,079,956
[45] Mar. 21, 1978

[54] MOTORCYCLE CAMPER

[76] Inventor: Marion Leon Headington, Jr., 1125 W. Orange Grove, Burbank, Calif. 91506

[21] Appl. No.: 661,740

[22] Filed: Feb. 26, 1976

[51] Int. Cl.² .................. B60R 15/02; B62K 27/00; B60P 3/34
[52] U.S. Cl. .................. 280/203; 296/23 R
[58] Field of Search .......... 280/203; 296/23 R, 23 A, 296/23 G, 22, 23; 135/1 A, 5 A

[56] References Cited

U.S. PATENT DOCUMENTS

| 1,562,371 | 11/1925 | Shanks ............... 296/23 |
| 1,755,593 | 4/1930 | Cavadas .............. 296/22 |
| 1,821,593 | 9/1931 | Vorst ................ 296/23 R |
| 2,057,197 | 10/1936 | Liptay ............... 280/203 |
| 2,225,993 | 12/1940 | Hornberger ........... 296/23 |
| 3,544,152 | 12/1970 | Low .................. 296/23 |
| 3,788,670 | 1/1974 | Peterson ............. 280/203 |
| 3,823,975 | 7/1974 | Cooper ............... 296/23 R |

FOREIGN PATENT DOCUMENTS

| 623,405 | 7/1961 | Italy ................ 296/23 R |
| 405,089 | 7/1966 | Switzerland .......... 296/23 R |

Primary Examiner—Richard J. Johnson
Attorney, Agent, or Firm—John E. Wagner

[57] ABSTRACT

A camping sidecar and trailer assembly designed for use in conjunction with a motorcycle. It comprises an elongated body with a wheeled suspension. The camper includes utility features such as storage space, a water reservoir, sink, cold storage, and cooking means. A cover encloses the top and one side of the camper and is movable to expose access to utility features of the camper and protects the utility features while in transit. The cover provides wind and rain protection for the utility features when in use and additionally provides partial support for an enclosing tent.

19 Claims, 11 Drawing Figures

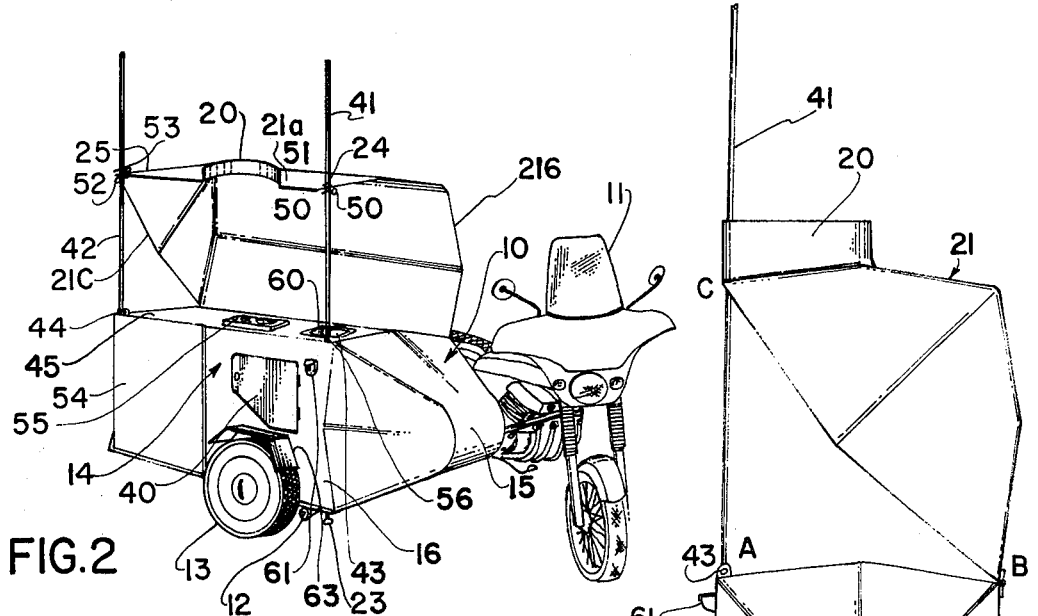
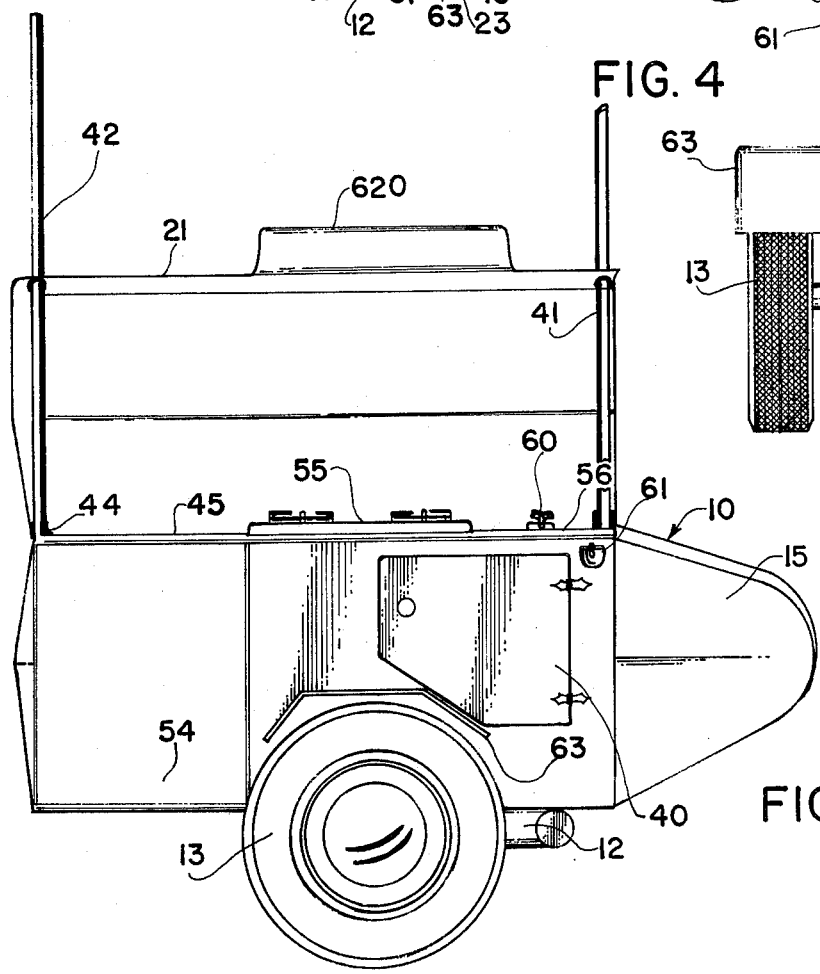

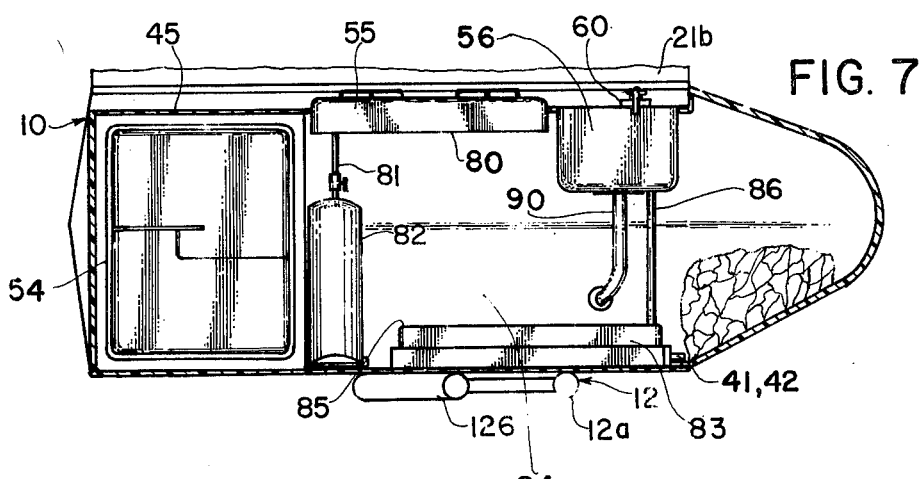
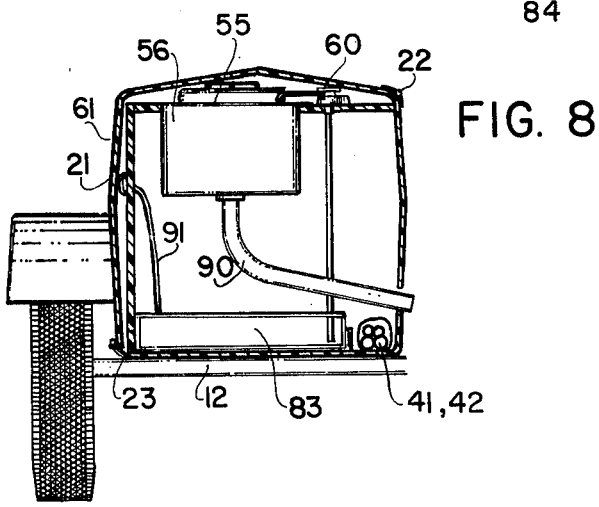
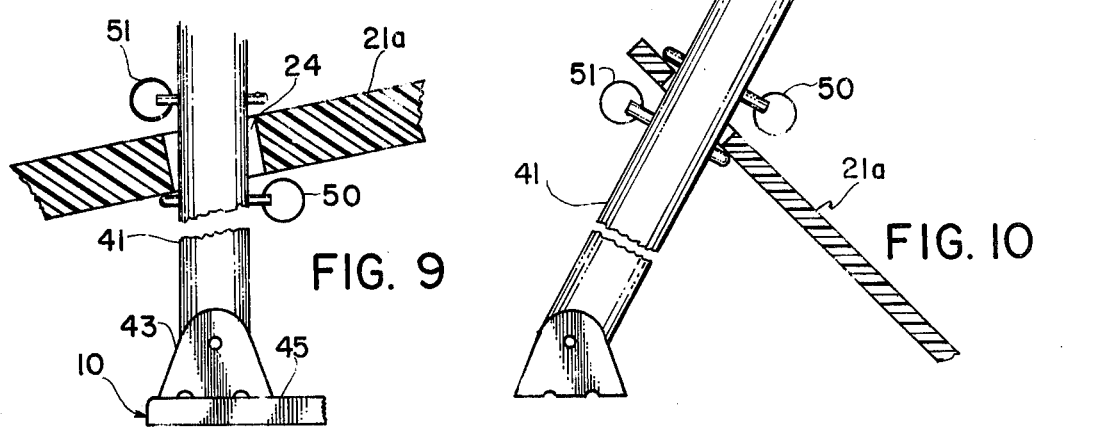

MOTORCYCLE CAMPER

BACKGROUND OF THE INVENTION

A sport growing in popularity is motorcycle touring. The freedom and versatility of the motorcycle, which has long been recognized, coupled with the low cost nature of the transportation, is totally consistant with touring and camping. As compared with four wheeled vehicles. trailers, motor homes, the motorcycle has many advantages to the traveler-camper. One major disadvantage which it encounters is that by its very nature, the motorcycle does not include significant storage space for the necessities of camping, namely a tent, food supplies, cooking equipment and other facilities.

Heretofore, attempts have been made to design a relatively large saddle bag type rear enclosure for carrying the necessary camping gear. These devices are necessarily limited in size to that which can be located over and around the rear wheel, like a saddle bag. It cannot obstruct your view of the rider.

Another approach has been to design trailers which are towed by a motorcycle. These devices each have similar characteristics to a so-called tent trailer, commonly associated with autos. Tent trailers for automobiles or motorcycle-towing typically are an open-top box with a frame, wheel assembly, and cover. The cover either contains or constitutes a tent which is expanded for use. The bed of the box usually constitutes the floor of the tent. Corner stabilizers are required for the box when the tent is erected. Such tent trailers still leave much to be desired for the motorcycle-camper.

BRIEF STATEMENT OF THE INVENTION

Faced with the foregoing prior art, I have designed and invented an improved motorcycle camper which may be used either as a sidecar or in an alternate configuration as a towed trailer. It comprises generally a stream-lined housing not unlike the conventional sidecar for motorcycles. The top and one side are hinged as a unit to raise, exposing an ice box, stove, sink, and storage compartment for personal gear and a tent. The top and sides provide a wind and rain shield for the ice box, stove, and sink portion when used while camping. The enclosure and the top and frame assembly also act as a portion of the framework for the tent when erected.

The entire assembly may be transported, used as a camp kitchen or used as a tent without removal from the motorcycle if desired. Alternately, it may be removed from the motorcycle and left at a stationary point while the motorcycle is employed in its normal manner for side trips.

The enclosure streamlined portion at the nose provides storage for the tent. The storage enclosure includes a water storage tank located along the bottom for added weight and stability of the camper without significant loss of storage space.

As designed, the ice box, stove, sink, and the storage space are all independently accessible once the top is raised. With the top down, all of the appliances are protected from the road dust and rain.

BRIEF DESCRIPTION OF THE DRAWINGS

The foregoing features of the invention may be more clearly understood from the following detailed description and by reference to the drawings in which;

FIG. 2 is a perspective view of the sidecar camper in accordance with this invention with its top raised ready for use as a camp kitchen;

FIG. 3 is a side elevational view of this invention as in FIG. 2;

FIG. 4 is a front elevational view of this invention with the top raised;

FIG. 7 is a vertical sectional view taken along line 7—7 of FIG. 1;

FIG. 8 is a vertical sectional view taken along line 8—8 of FIG. 1;

FIG. 9 is a fragmentary section of the support arrangement for the cover shown in FIG. 2;

FIG. 10 is a fragmentary sectional view of support arrangement of the top and tent as shown in FIG. 6.

DETAILED DESCRIPTION OF THE INVENTION

Figure 1:
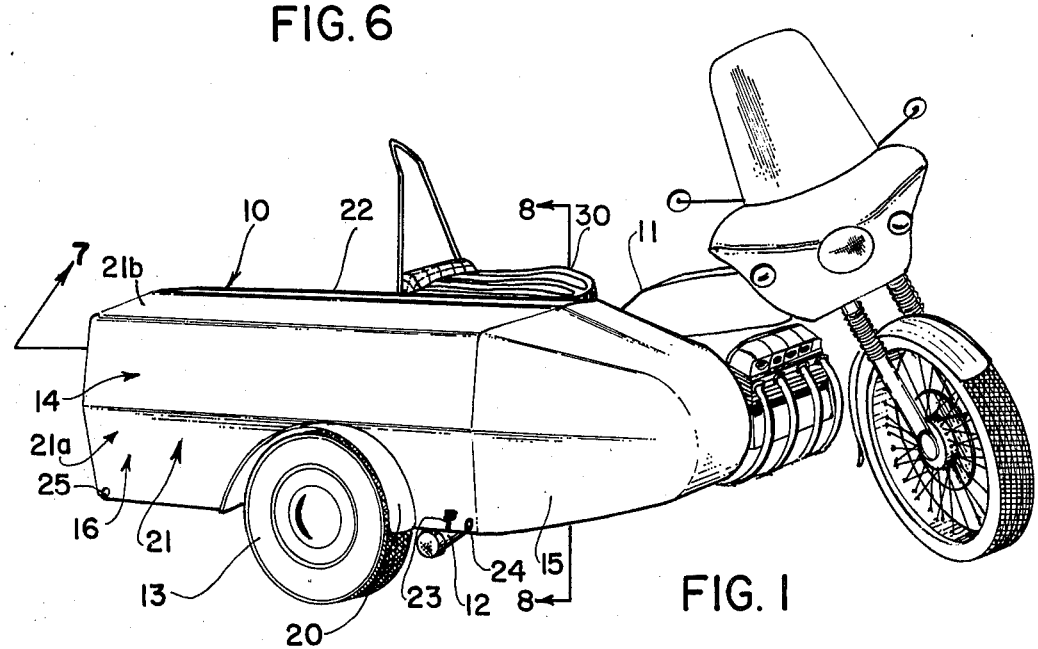
FIG. 1 is a perspective view of a sidecar camper in accordance with this invention ready for on or off road use.

Now referring to FIG. 1, a camper of this invention generally designated 10 is shown attached to a motorcycle 11 by a suspension assembly 12, one member of which appears in the drawing. The camper 10 has a general appearance of a motorcycle sidecar without an opening for passengers and includes a single wheel 13 journaled from the frame and suspension system 12 in a manner well known in the motorcycle sidecar field. In fact, a motorcycle sidecar frame may be used.

The camper 10 includes a body 14 including a streamlined nose fairing 15 and a general rectangular or box-like body section 16. The overall length of the camper may be in the order of 5 to 6 feet, as a suitable size for four campers. In the preferred embodyment as shown in FIG. 1, a fender 20 is formed integrally with the housing 16 and more specifically as a part of the unitary cover 21 forming a side 21a and top 21b. This unitary cover 21 is hinged to the body 14 by a continuous piano-type hinge 22 from the upper inboard corner. The cover 21 includes a fastener 23 secured to the body 14. The fastener 23 may be any of several types such as the flexible rubber T-shaped fasteners, commonly used in automotive fields for hood retention. The cover 21 includes a pair of openings 24 and 25, the purpose of which may be more apparent in connection with the further description.

In the preferred embodiment, the nose fairing 15 is fixed, however it may be openable as by hinging or latching if it is so desired.

As shown in FIG. 1, the camper of this invention constitutes a basically stream-lined sidecar having a minimum wind resistance and tracking capabilities as good as conventional sidecars. Since it approximates the length of the motorcycle 11, and is no higher than the seat 30 of the motorcycle 11, therefore it does not interfer with the rider's visibility.

The camper of this invention as will be described below is designed to have a low center of gravity whereby it does not detract from the roadability of the motorcycle.

When the motorcycle camper of this invention reaches a camping place, the camper is converted to the configuration shown in FIG. 2. The only action that is needed to be taken after dismounting the motorcycle 11 is to release the fastener 23, raise cover 21, open a side-access door 40, remove two support poles 41 and 42, insert them through the openings 24 and 25, and place them in their respective brackets 43 and 44 in the top surface 45 of the camper 10, and secure the cover 21 in place by pushpins 50 through 53, with one pushpin below the side wall 21a and through each of the poles 41 and 42 and a second pushpin 51 and 53 through respective poles 41 and 42 above the side 21a. The details of this arrangement are best seen in FIG. 9. Noting the angular shape of the top portion 21b and the side portion 21a, the raised cover 21 and the poles 41 and 42 establish a stable geometric shape, e.g. a triangle of three bars, which constitutes a wind and rain shield for the camping appliances contained under the cover 21. The stable shape best seen in FIG. 4 is made up of the top 45 of the body 10, the two brackets 43 and 44 constituting apexes A and B, the poles 41 and 43 constituting a second side and the cover 21 the third side of the triangle joining the poles at apex C.

The appliances include an ice box 54, a camp stove 55, and a sink 56 with its associated pump 60. A water-fill inlet 61 is located in the side wall of the camper in the area protected by the cover 21 when it is closed. The inlet 61 communicates with the water storage reservoir and is better seen in FIGS. 7 and 8. As shown in FIG. 2, and better in FIG. 3, the integral fender portion 20 forming a part of the cover 21 raises out of the way when the cover 21 is lifted. An optional fender liner 63 is secured to side wall 14 of the camper 10 and provides a small resting place when objects are being removed from the access opening 40 and further prevents road dust and moisture thrown off by the tires 13 in traveling from reaching the fender 20. It should be noted also that the cover 21 includes a half end 21C at the rear. This end 21C adds strength to the cover 21 and when the cover 21 is in an elevated position, also provides an additional wind and rain barrier.

Each of these camping appliances available with the cover 21 up is more clearly seen in FIGS. 3 and 4. The ice box 54 located at the rear provides a work surface 45 on its upper surface immediately adjacent to the stove 55 with the sink 56 and its pump-type faucet 60 located in front of the wheel 13. The access door 40, located where it allows easy access to the tent storage compartment includes the area enclosed by the fairing nose and the major space forward of the ice box 54. The specific location of parts of each of these elements is better seen in the longitudinal section of FIG. 7.

Now referring to FIG. 7, the refrigerator may be seen as a conventional miniature camping ice box of approximately 20 by 24 by 24 inches in dimension and including provision for ice storage and ice trays. Alternately the cold storage box may be a refrigerator or powered by propane or from the electrical system of the motorcycle.

The ice box 54 includes its own insulation so is nearly a self-contained unit within the camper 10. The upper surface of the body 14 or the refrigerator 54 constitutes the work surface 45. Note that the stove 55 is recessed in the surface 45 and includes an inner pan 80 and conduit 81 connected to an interchangable or refillable propane or other fuel tank 82 preferably located within the interior of the camper 10 and available for change via the access door 40 of FIGS. 1 and 3.

Within the camper body 14 is a water reservoir 83 located on the bottom of the storage compartment 84. The water reservoir is preferably rectangular in shape and its upper surface 85 can act as the floor of the storage compartment 84. The poles 41 and 42 may be stored within the enclosure behind, in front of or on top of the reservoir 83. I have found that the poles 41 and 42 plus additional poles used in connection with the erection of the tent of this invention as further described, may be placed neatly in an elongated bag of approximately 4 feet in length, 3 inches in diameter, which can be stored on the bottom of the storage compartment 84 behind the reservoir 83.

A tent 100 neatly fits in the nose fairing and is accessible through access door 40. Note in FIG. 7 that the reservoir 83 is connected via flexible tubing 86 to the water pump 60 in position to draw water for the sink 56. A flexible drain hose 90 connects from the sink 56 down through an opening in the rear or inboard wall of the camper 10 where it normally remains capped until used. The exterior end of the drain hose 90 appears in FIG. 4 and in FIG. 8.

Referring now specifically to FIG. 8, the location of the tent poles 41 and 42 and their additional poles may be seen behind the reservoir 83. One further detail in this invention visible in FIG. 8 is the filler tube 91 communicating between the inlet 61 for water and the reservoir 83. Also, in FIG. 8, note that the stove 55, sink 56, pump 60, and water inlet 61 are all concealed within the cover 21 held in place by the latch 23.

Figure 5:
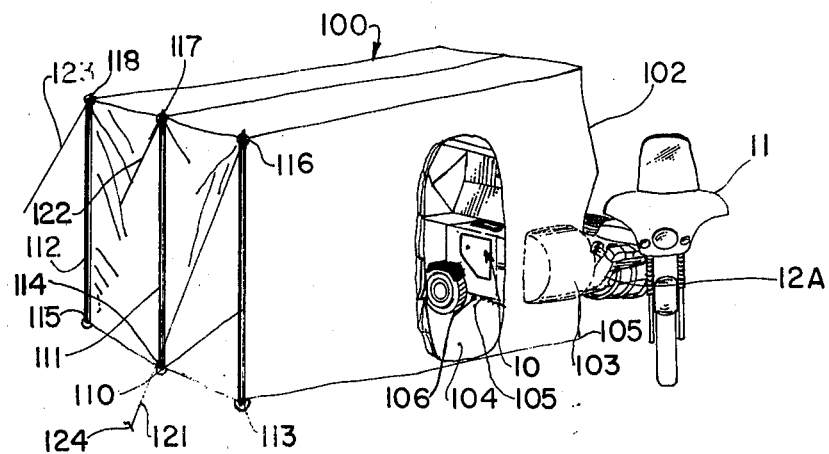
FIG. 5 is a perspective view of the side car camper of this invention with its tent erected.
Figure 6:
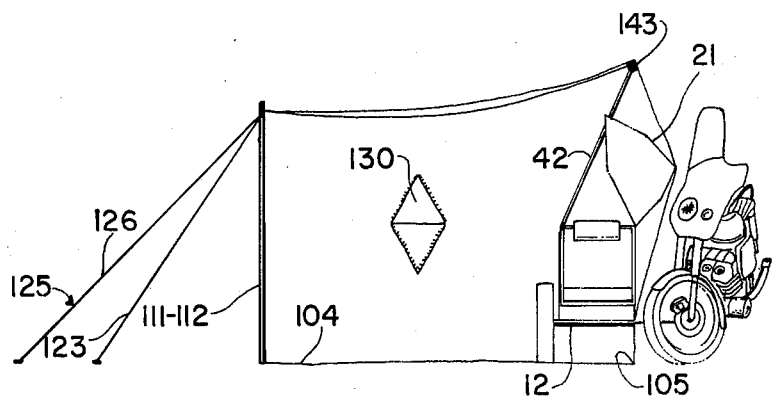
FIG. 6 is a sectional view through the tent and camper of this invention taken along line 6—6 of FIG. 5.

The foregoing all describe the camper of this invention when being transported in FIG. 1, or used in FIG. 2, and FIG. 8, in fair weather where no rain protection is required. Whenever inclement weather threatens, the camper tent constitutes part of the support for a tent suitable in size for four persons camping. When inclement weather threatens, the tent of this invention may be easily erected to a form as shown in FIG. 5. It should be noted that the camper 10 is located within the tent 100 in fully operational condition without any change or interference by the tent. As noted in FIG. 4, the tent is a modified shed roof design with the outer end 101 slightly lower in elevation than the inboard end 102, adjacent to the motorcycle 11. The tent 100 includes optionally an extension 103 to cover the nose fairing of the camper 10, or if desired, the tent 100 can be large enough to enclose the entire camper without the extension 103. I have found, however, that the size illustrated in FIG. 5 is adequate for four campers. Now referring specifically to FIG. 6, it may be seen that the poles 41 and 42, one of which, 42, appears in FIG. 6, are slightly tipped in the inboard direction and the cover 21 likewise is tipped backwards further than in the position shown in FIG. 2. This provides greater access to the camp kitchen equipment and also provides a rigid structure for a third cross piece 143 which acts as the tent peak support.

The tent 100 includes a floor 104 which has corner fastener, for example a zipper 105, extending along the inboard length and an additional zipper 106 to allow the tent to enclose the camper 10 without movement of the camper 10 during the tent erection and striking process. The tent 100 includes three additional poles 110, 111 and 112 which preferably are located outside of the tent 100 and pass through respective ground flaps 113, 114 and 115 at the bottom and similar flaps 116, 117 and 118 at the top. The poles 110-112 may be telescoping, foldable or otherwise disassemblable to provide a length no greater than 4 feet for storage in the camper 10 during travel. Each of the poles 110-112 preferably have an external guy lines 121, 122 and 123 with their own ground stake, one of which 124 appears in FIG. 5, and their counterparts 125 and 126 connected with guy lines 122 and 123 respectively are shown in FIG. 6. The tent 100 also preferably includes one or more windows as represented by window 130 with its closure flap as appearing in FIG. 6. It is apparent from both FIGS. 5 and 6 that full access to the camper 10 is available totally within the tent.

The arrangement by which the cover 21 and the support rods 41 and 42 cooperate in both the outside camping or tent camp modes is apparent in FIGS. 9 and 10.

Now referring to FIG. 9, one of the support pole rods 41, for example, is pivoted on bracket 43 secured to the surface 45 of the camper 10 and includes a pair of openings through which pushpins 50 and 51, or other type of removable stops may be inserted. In the configuration of FIGS. 2, 3 and 4, the rods 41 and 42 are pivotally secured to the bracket 43 and the pushpin 50 and inserted through the opening 24 in the side portion 21a on the cover 21 which is then located at the near horizontal level. Thereafter, pushpin 51 is inserted above the portion 21a to prevent wind from lifting it. Thereafter, the structure as shown in FIG. 2 of the cover 21 and poles 41 and 42, constitutes a relatively stable wind and rain shield.

With two simple modifications, the arrangements of FIGS. 2 and 9 is changed to convert the assembly into tent supports. In that case, the pin 51 is temporarily removed and the cover 21 slid upward on the rod 41 until it passes the first of the second pair of openings and the pin 51 is inserted in the first of the second pair of openings. Pin 50 is then removed and inserted in the second of the second pair of openings whereby the cover 21 is held at a slightly elevated position and the poles 41 and 42 lean backward in a position illustrated in FIG. 6. The same triangular stability described below exists. Thereafter rod 143 is secured in place on the ends of rods 41 and 42. The tent 100 is next placed over the camper 10 with the upper corner extending along rod 143. Thereafter, the tent may be stretched out as shown in FIGS. 5 and 6 and the remaining poles 110 through 112 placed.

Striking the tent 100 involves basically the reversal of the steps described above and storage of the tent and tent poles within the camper 10. When so stored and the cover 21 is dropped into position and secured by latch 23, the camper 10 is road ready. This can be accomplished in just a few minutes.

Figure 11:
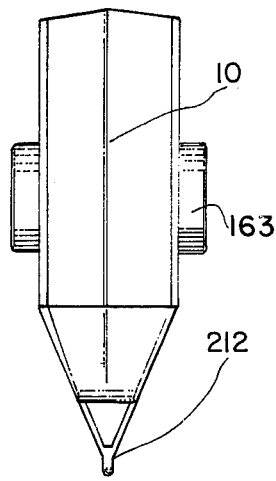
FIG. 11 is a top view of a trailer version of this invention.

In each of the foregoing embodiments the camper is shown as a sidecar. It is apparent that the same concept is directly applicable to a trailerable version and that version is shown in the top view in FIG. 11. The only significant difference is the addition of a second wheel 60 and its fender 163 and a trailer yoke 212 instead of the frame 12 of FIGS. 1 and 6. The configuration shown in FIG. 11 shows that the camper 10 is only slightly wider than the motorcycle and therefore all the advantages of narrow width of the motorcycle are again attributed to the trailer version of the camper as shown in FIG. 11. The low center of gravity of the camper 10 is accomplished in a large part by the low mounted reservoir 83 of FIGS. 7 and 8, and also adds stability to the trailer version of FIG. 11.

The above described embodiments of this invention are merely descriptive of its principles and are not to be considered limiting. The scope of this invention instead shall be determined from the scope of the following claims, including their equivalents.

What is claimed is:

1. A portable camper comprising an elongated body; a cover for a major portion of the length of said body; said cover hinged at one corner and overlying said body, top and substantial portion of one side thereof;
said cover pivotable downward to constitute the major portion of the top of the camper and substantially one side thereof and pivotable upward to expose one side and a top surface of said camper body;
means for supporting said cover in the position exposing the working surface and side of said body;
said working surface of said body mounting at least one camping kitchen appliance in the upper surface thereof; and
said body including an access door communicating with the interior thereof;
a wheel suspension for supporting said body;
means for attaching said camper to a powered vehicle for transport thereby; wherein
said wheel suspension includes a single wheel and said attaching means includes means for securing said camper onto the side of a motorcycle whereby said camper constitutes a sidecar camper.

2. A portable camper comprising an elongated body; said body having an upper surface constituting a working surface and including at least one door on the side of said body;
a cover for a major portion of the length of said body;
said cover hinged at one edge defined by one elongated side and the top thereof;
said cover pivotable downward to constitute the major portion of the top of the camper and substantially one side thereof and pivotable upward to expose one side exposing said door and said working surface of said camper body;
means for supporting said cover in the position exposing the working surface and door of said body;
a wheel suspension for supporting said body;
means for attaching said camper to a powered vehicle for transport thereby;
said cover enclosing both said working surface and said door when in a closed position whereby the single member of said cover provides protection for both from the elements and travel contamination when in a lowered position;
wherein said working surface of said body beneath said cover mounts stove means.

3. A portable camper comprising an elongated body; said body having an upper surface constituting a working surface and including at least one door on the side of said body;
a cover for a major portion of the length of said body;
said cover hinged at one edge defined by one elongated side and the top thereof;
said cover pivotable downward to constitute the major portion of the top of the camper and substantially one side thereof and pivotable upward to expose one side exposing said door and said working surface of said camper body;

means for supporting said cover in the position exposing the working surface and door of said body;
a wheel suspension for supporting said body;
means for attaching said camper to a powered vehicle for transport thereby;
said cover enclosing both said working surface and said door when in a closed position whereby the single member of said cover provides protection for both from the elements and travel contamination when in a lowered position;
wherein the upper surface of said body beneath said cover includes a sink.

4. A portable camper comprising an elongated body; a cover for a major portion of the length of said body;
said cover hinged at one corner and overlying said body, top and substantial portion of one side thereof;
said cover pivotable downward to constitute the major portion of the top of the camper and substantially one side thereof and pivotable upward to expose one side and a top surface of said camper body;
means for supporting said cover in the position exposing the working surface and side of said body;
said working surface of said body mounting at least one camping kitchen appliance in the upper surface thereof; and
said body including an access door communicating with the interior thereof;
a wheel suspension for supporting said body;
means for attaching said camper to a powered vehicle for transport thereby;
the upper surface of said body beneath said cover includes a sink;
a water reservoir means within said body;
inlet means connected from the exterior of said body to said reservoir; and
supply means connected from said reservoir from said sink; wherein
said reservoir is located within said body as an elongated flat topped chamber and the upper surface of which constitutes a shelf for storage of articles within said body.

5. The combination in accordance with claim 4 wherein said attaching means includes a pair of wheels and wherein said attaching means constitutes a towing yoke whereby said camper may by towed by a vehicle.

6. The combination in accordance with claim 4 wherein the inlet to said reservoir is covered by said cover when said cover is closed.

7. A portable camper comprising an elongated body;
said body having an upper surface constituting a working surface and including at least one door on the side of said body;
a cover for a major portion of the length of said body;
said cover hinged at one edge defined by one elongated side and the top thereof;
said cover pivotable downward to constitute the major portion of the top of the camper and substantially one side thereof and pivotable upward to expose one side exposing said door and said working surface of said camper body;
means for supporting said cover in the position exposing the working surface and door of said body;
a wheel suspension for supporting said body;
means for attaching said camper to a powered vehicle for transport thereby;
said cover enclosing both said working surface and said door when in a closed position whereby the single member of said cover provides protection for both from the elements and travel contamination when in a lowered position;
wherein said body includes a cold storage chamber;
said cold storage chamber having an access door in the side of said body.

8. The combination in accordance with claim 7 wherein the access door to said cold storage chamber is covered by said cover when it is closed.

9. A portable camper comprising an elongated body;
a cover for a major portion of the length of said body;
said cover hinged at one elongated top edge corner and overlying said body, top and substantial portion of one side thereof when in a closed position;
said cover pivotable downward to constitute the major portion of the top of the camper and substantially one side thereof and pivotable upward to expose one side and a top working surface of said camper body;
means for supporting said cover in the position exposing the working surface and side of said body;
said support means comprising at least one pole securable to said body and to an edge region of said cover;
said pole and cover with the top surface of said body comprising a generally hinged triangular shape exhibiting position retaining characteristics;
said body including an access door communicating with the interior thereof in the side of said body exposed by the cover when elevated;
a wheel suspension for supporting said body; and
means for attaching said camper to a powered vehicle for transport thereby.

10. The combination in accordance with claim 9 including a pair of poles, one positioned at each free corner of said cover.

11. The combination in accordance with claim 10 wherein each of said poles pivotally is secured to said body.

12. The combination in accordance with claim 10 including a tent and wherein said poles constitute a partial support for said tent while supporting said cover.

13. The combination in accordance with said claim 12 including rod means extendable between said poles and constituting an apex defining support for said tent.

14. The combination in accordance with claim 13 including auxiliary support means spaced from said rod to define an enclosed tent structure shape wherein said auxiliary support means are spaced from the side of said camper opposite the hinged attachment of said cover whereby the working surface of said camper, when opened, is accessible to the interior of said tent.

15. A portable camper comprising an elongated body;
a cover for a major portion of the length of said body;
said cover hinged at one corner and overlying said body, top and substantial portion of one side thereof;
said cover pivotable downward to constitute the major portion of the top of the camper and substantially one side thereof and pivotable upward to expose one side and a top working surface of said camper body;
means for supporting said cover in the position exposing the working surface and side of said body;

said support means comprising a pair of poles securable to said body and to respective corners of said cover;

each pole and cover comprising a generally hinged triangular shape exhibiting position retaining characteristics;

said body including an access door communicating with the interior thereof;

a wheel suspension for supporting said body; and means for attaching said camper to a powered vehicle for transport thereby;

wherein said poles pass through openings in said cover and including means for restraining the movement of said cover along the length of said poles.

16. The combination in accordance with claim 15 wherein said restraining means comprise a pair of pins extending through said poles, one of said poles on each side of said cover.

17. The combination in accordance with claim 15 wherein said cover is movable to a second position and securable thereto by said restraining means wherein said cover portion constituting a side of the camper is in an elevated position above the horizontal.

18. The combination in accordance with claim 17 wherein said tent, when erected, encloses said camper.

19. A portable camper comprising an elongated body; a cover for a major portion of the length of said body;

said cover hinged at one corner and overlying said body, top and substantial portion of one side thereof;

said cover pivotable downward to constitute the major portion of the top of the camper and substantially one side thereof and pivotable upward to expose one side and a top working surface of said camper body;

means for supporting said cover in the position exposing the working surface and side of said body;

said support means comprising a pair of poles securable to said body and to respective free corners of said cover;

each pole and cover comprising a generally hinged triangular shape exhibiting position retaining characteristics;

said body including an access door communicating with the interior thereof;

a wheel suspension for supporting said body; and means for attaching said camper to a powered vehicle for transport thereby;

wherein said poles have two positions for securement to said cover thereto where in one position, the side portion of said cover is in the substantially horizontal position and overhanging said work surface.

* * * * *